United States Patent [19]

Jackson

[11] Patent Number: 4,676,272

[45] Date of Patent: Jun. 30, 1987

[54] AIR FLOW CONTROL VALVE

[76] Inventor: Larry L. Jackson, Rte. 3, Sterling, Colo. 80751

[21] Appl. No.: 219,493

[22] Filed: Dec. 23, 1980

Related U.S. Application Data

[62] Division of Ser. No. 69,244, Aug. 23, 1979, Pat. No. 4,262,655.

[51] Int. Cl.⁴ .......................................... F16K 11/085
[52] U.S. Cl. .............................. 137/625.41; 98/38.5; 251/314; 126/429; 126/435; 236/13
[58] Field of Search ................... 98/38 B; 137/625.41, 137/625.47; 236/13; 251/314, DIG. 5; 126/429, 435

[56] References Cited

U.S. PATENT DOCUMENTS

| | | | |
|---|---|---|---|
| 1,320,627 | 11/1919 | Long | 137/625.47 X |
| 2,057,033 | 10/1936 | Kelley | 137/625.41 X |
| 3,314,644 | 4/1967 | Dwyer | 251/314 X |
| 3,742,983 | 7/1973 | Harter | 137/625.47 X |
| 3,938,553 | 2/1976 | Ortega | 137/625.47 |
| 4,141,337 | 2/1979 | Bergen | 126/429 |
| 4,249,512 | 2/1981 | Rivetti | 126/435 |

Primary Examiner—Arnold Rosenthal
Attorney, Agent, or Firm—Gregg I. Anderson

[57] ABSTRACT

An air flow control valve for directing air flow within a house or building. The control valve can selectively direct air flow between two alternative air flow paths. The control valve is of generally cylindrical configuration having an open wall portion or an open wall portion and an open base. The cylinder valve is pivotally mounted within a chamber providing air flow communication through ductwork with at least one thermal source area and at least one area of thermal need.

8 Claims, 8 Drawing Figures

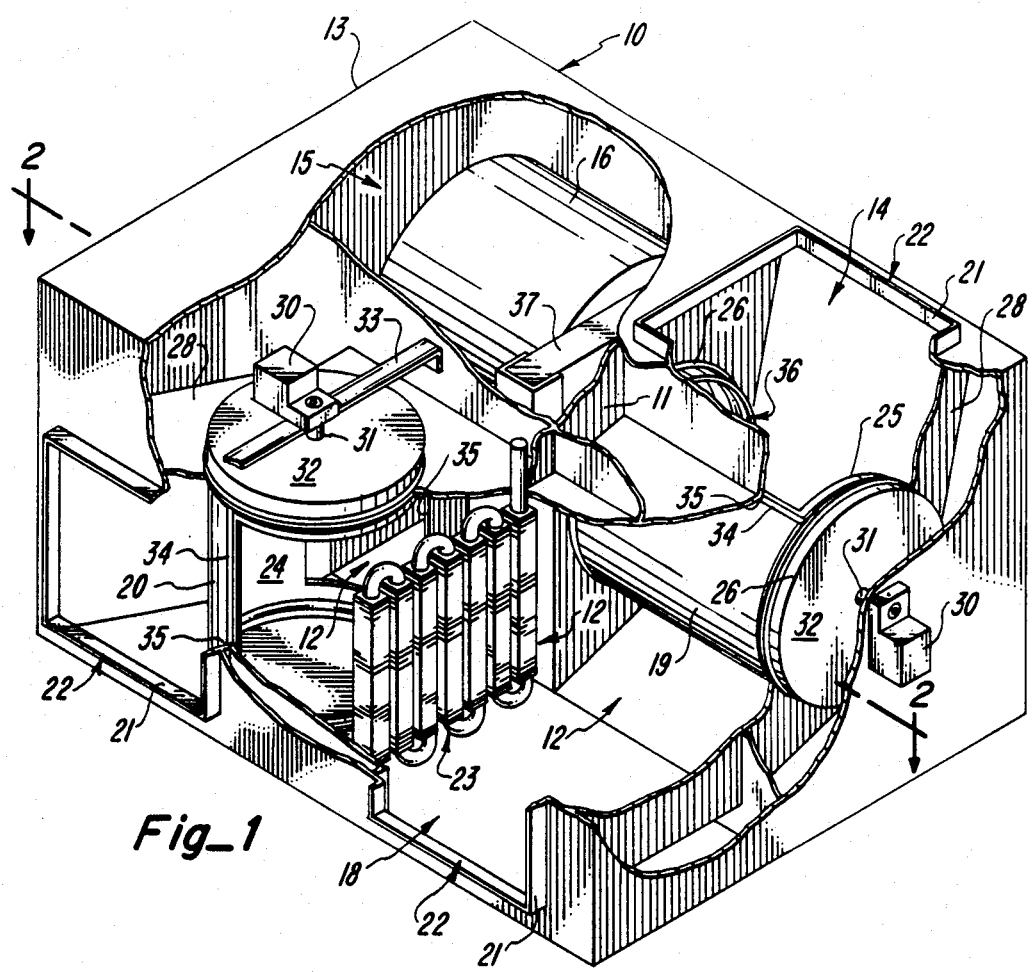
Fig_1
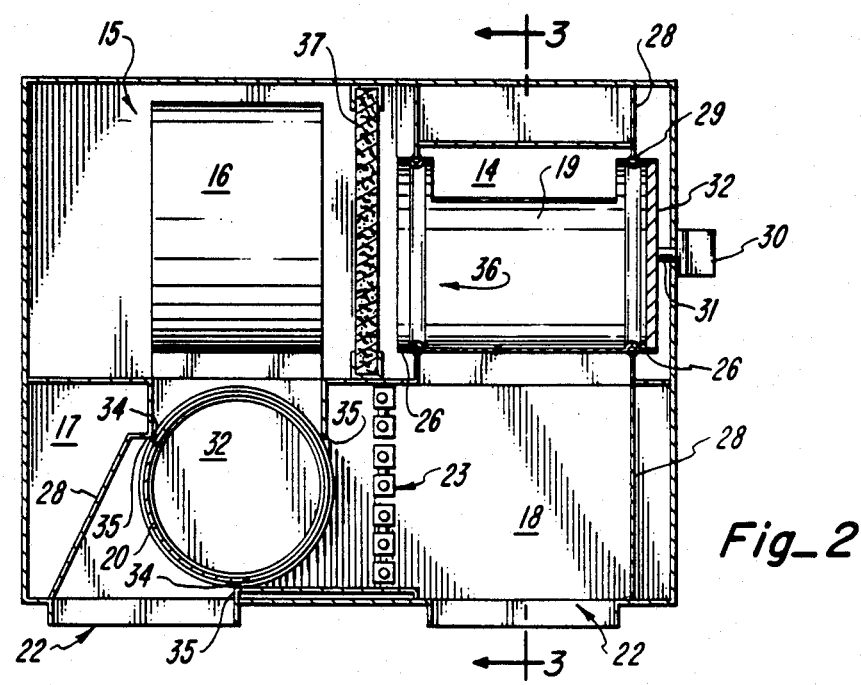
Fig_2

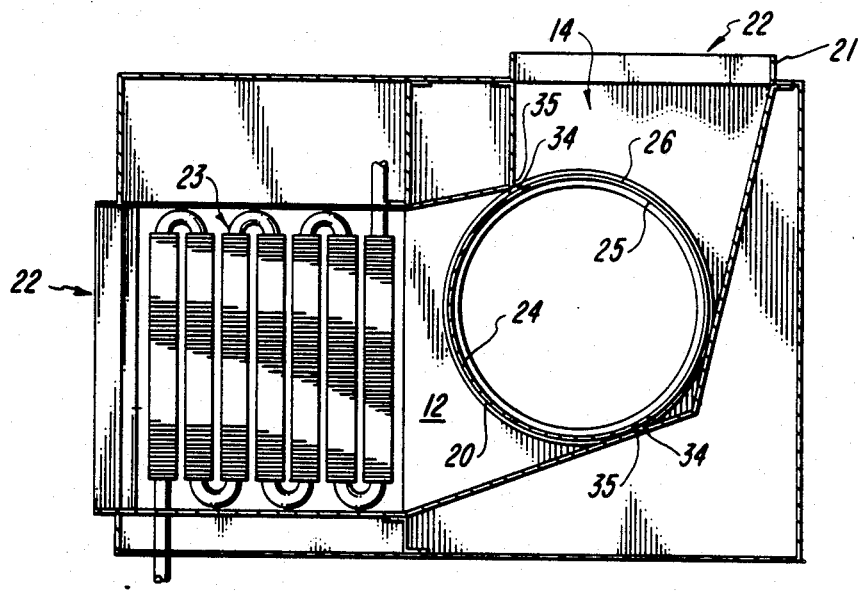
Fig_3
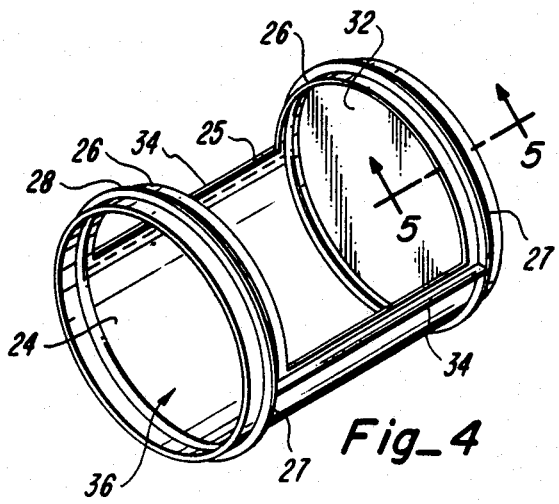
Fig_4
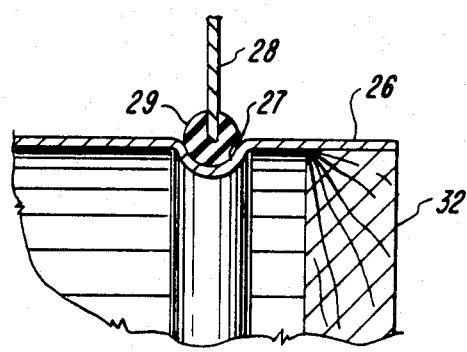
Fig_5

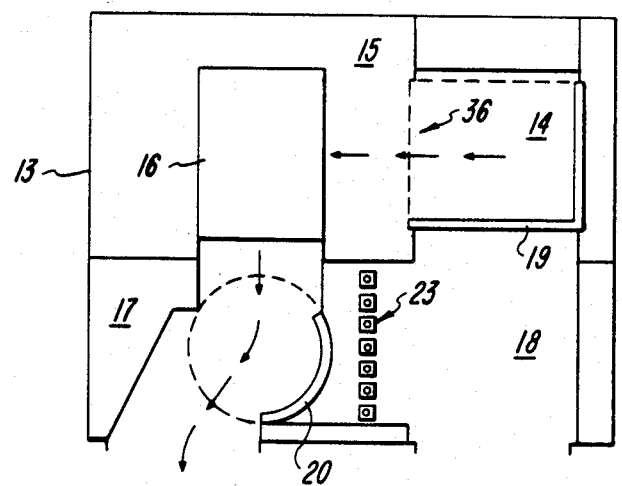
Fig_6a
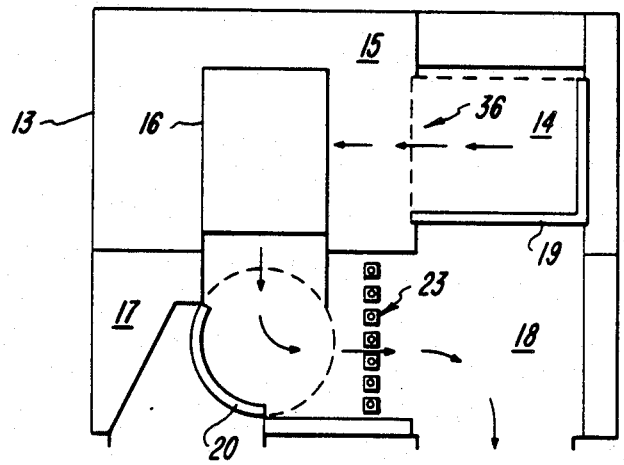
Fig_6b
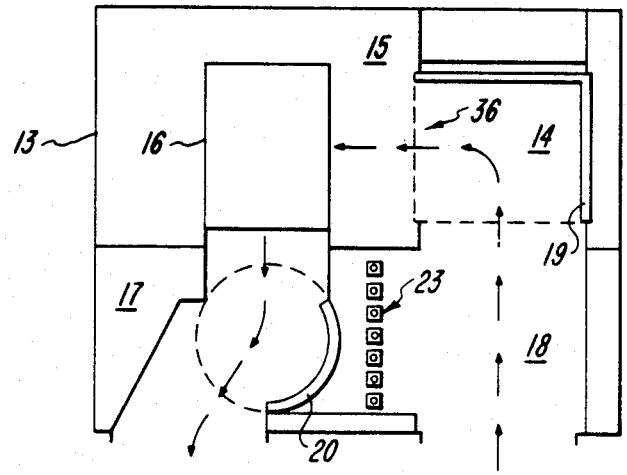
Fig_6c

AIR FLOW CONTROL VALVE

CROSS REFERENCE TO RELATED APPLICATIONS

This application is a division of U.S. patent application Ser. No. 069,244 filed Aug. 23, 1979 now U.S. Pat. No. 4,262,655 issued Apr. 21, 1981.

BACKGROUND OF THE INVENTION

1. Field of the Invention

The apparatus of the present invention relates to air flow controllers, and more particularly to air flow controllers suited for use in solar energy heating systems.

2. Description of the Prior Art

As the attractiveness of solar heating is recognized as a pollution free and inexhaustible source of energy, numerous attempts have been made to efficiently harness the energy available. At the present time the most viable method involves using a heat collector to accumulate energy from the sun. The collector is connected to both the building to be heated and a storage unit, such as an enclosure containing rock buried under the ground.

There has been very little development in the area of solar controllers for controlling the flow of heat between the storage, collecting and use areas. An example of such a unit, however, is described in U.S. Pat. No. 4,129,116 to T. B. Kent.

Most prior art controllers utilize pivotal plates to control air flow. Due to configuration problems, these flat plates must be ganged in pairs through a linkage arrangement in order to provide two passageways through a given chamber of a controller. Not only is a linkage necessary, but a biasing of the plate that is not powered is also required. More moving parts means, quite simply, less reliability and more operational maintenance.

Aerodynamic forces resulting from both positive and negative forces from the blower, do affect controls. Lower pressures have a tendency to create lift on the control surface on the side exposed to the lower pressure. If the plate then "floats" from its closed position, the lower pressure created by flow across the surface helps draw air from a cooler location with a resultant lowering of efficiency.

Prior art controls are also heavily effected by their own weight. This gravity factor can enhance "floating" controls and further limits the orientation controls may have within a controller system. Therefore, an axis of rotation for controls has always been perpendicular to the surface of the earth, and no moments of rotation are created by gravitational forces. Horizontal orientation for controls was therefore unavailable in the prior art because a horizontal plane would increase gravitational effects. This results in control units that must be aligned in only one plane for best effect.

SUMMARY OF THE INVENTION

The principle object of the present invention is to provide a control valve for a solar heat system that efficiently directs air within the system.

A related object of the present invention is to provide a control valve for a solar heat system that improves air flow characteristics.

In accordance with the objects of the invention, a solar controller has two flow control cylinder valves of the present invention, a blower control cylinder valve and a collector control cylinder valve, disposed within the chambers of the four chambered control module with the control cylinders serving to selectively divert air through predetermined chambers. A blower chamber contains a blower of conventional type. The remaining three chambers, two of which contain control cylinders, are connected by ductwork to the building or area to be heated, the heat collector and the storage unit respectively. All chambers, which are defined as the blower chamber, the collector chamber, the storage chamber, and the building chamber, have passageways connecting any given chamber, in air flow communication, with the chambers on either side.

The collector control cylinder valve is disposed in a collector chamber, which is in selected fluid communication with the solar heat collector, the blower chamber and the storage chamber. The control cylinder is of generally cylindrical shape having a portion thereof removed to leave an open side and a flow deflector side, which acts as a vane. Mounting rings at either end contain tracks so that the cylinder may rotate. The tracks receive sheet metal of ductwork in such a manner as to substantially seal the rotatable mountings. The collector cylinder valve discharges air through a hollow base portion to the blower chamber. Depending on the operating mode selected, this air comes from either the collector or the storage unit.

The blower control cylinder valve controls air flowing from the blower itself. It does not use base port exhaust like the collector control cylinder, but rather exhausts air radially off of the flow deflector either to the storage unit, through an air-liquid heat exchanger for use in hot water heating, or to the building.

The cylinder valves are both rotatable between two positions. Either one of the two positions closes off one passageway within the module. Depending upon the position of the cylinder valves, air can be taken from the collector through the blower and to the building in a first mode or through the blower and to the storage unit through an air-liquid heat exchanger in a second mode. When heat is required from the storage unit, the cylinder valves are positioned in a third mode to allow the blower to draw air from the storage unit through the collector cylinder valve and blow it through the blower cylinder valve into the building to be heated. The first and third modes by-pass the air-liquid heat exchanger.

BRIEF DESCRIPTION OF THE DRAWINGS

FIG. 1 is a perspective view of a solar controller using the cylinder valves of the present invention, with parts broken away for clarity.

FIG. 2 is a reduced section taken along line 2—2 of FIG. 1.

FIG. 3 is a section taken along line 3—3 of FIG. 2.

FIG. 4 is a perspective view of one of the flow cylinder valves of the invention.

FIG. 5 is an enlarged fragmentary section taken along line 5—5 of FIG. 4.

FIG. 6a is a schematic view of the first mode of control of the air flow of the solar controller.

FIG. 6b is a schematic view of the second mode of control of the air flow of the solar controller.

FIG. 6c is a schematic view of the third mode of control of the air flow of the solar controller.

DESCRIPTION OF THE PREFERRED EMBODIMENT

A solar heat controller 10 is shown for use in conjunction with a solar heating system having a heat collector (not shown) placed in a location exposed to the sun and a solar storage unit (not shown) such as rock. Such systems are currently in fairly wide use and are available commercially from any number of manufacturers. The primary use for such a solar heating system is in the heating of homes, buildings, or other areas, either alone or in conjunction with well known electric and gas forced air heating methods.

The solar controller 10 is contained within a control module 13 constructed of light weight sheet metal of generally rectangular transverse as well as longitudinal cross section (FIG. 1). The module 13 is in turn divided by sheet metal partitions 11 into four generally equal chambers or quadrants which assist in directing air flow within the module 13. Each of the chambers is capable of full air flow communication with the chambers immediately adjacent thereto through passageways 12 between chambers. Thus, each of the four chambers has two passageways 12 that are in air flow communication with the adjacent chambers.

The four chambers include in sequential order around the quadrants of the module 13, a collector chamber 14, a blower chamber 15, a building chamber 17, and a storage chamber 18. Conventional connecting ducting, now shown, provides for transport of the air from the collector to the collector chamber 14. The duct is connected to ducting flanges 21 disposed about the perimeter of a port 22 leading into the collector chamber 14. Similar ducting flanges and ports connect the building chamber 17 to the building or area to be heated and the storage chamber 18 to the storage unit. The blower chamber does not have a port 22 leading to an external area.

Disposed between the collector chamber 14 and the blower chamber 15, is a filter 37 of conventional type. It should be noted for later reference that no matter what mode of control the controller 10 takes, air flow is channeled through the passageway 12 between the collector chamber 14 and the blower chamber 15, thereby passing through the filter. Within the blower chamber itself is retained a conventionally powered blower 16 which creates a positive pressure downstream in the building chamber, and a negative pressure upstream in the collector chamber. The pressure differences act to draw air from whatever heat source is utilized, either the collector or the storage unit, and direct it into the building chamber 17 from whence it is directed either to the building through the port 22 or back to the storage unit through the storage chamber 18.

Between the building chamber 17 and the storage chamber 18 is located an optional heat exchanger 23. The heat exchanger adds an additional feature to the solar controller (FIGS. 1 and 2). The heat exchanger is subjected to hot air flowing through the passageway 12 and thereby assists in the heating of water in a home or building. Appropriate temperature controls permit the heat transfer to occur when the collector heat is above the water temperature. The controls are set to actuate a pump relay (not shown) set to pump water through the heat exchanger 23 when the proper conditions are met.

The solar heat controller 10 utilizes control cylinder valves 19 and 20 disposed respectively within the collector chamber 14 and the building chamber 17 to direct flow toward a port 22 or passageway 12, or, alternatively, to prevent or block flow from or to a port or passageway. A collector flow control cylinder valve 19 is located within the collector chamber 14, while a blower flow control cylinder valve 20 is located within the building chamber 17. Both of the cylinders are of substantially the same construction.

The flow control cylinder valves 19 and 20 are generally of hollow cylindrical configuration (FIG. 4). A portion of the cylinder wall is removed leaving an open side 25, with the remaining portion of the cylinder wall forming a flow deflector 24. The open side of the collector cylinder is ideally one half or 180° of the cylinder circumference. The collector control cylinder 19 is rotatable between a position wherein the open side is presented in communication with the collector chamber port 22 and a position wherein the open side is presented in air flow communication with the storage chamber passageway 12. Air flow is thus directed off the flow deflector 24 through an open base port 36 in the end of the cylinder 19. The base port is in continuous communication, regardless of the position of the control cylinder 19, with the blower chamber 15.

The blower control cylinder valve 20 presents its open side in air flow communication at all times with the blower chamber 15 and consequently exhaust from the blower 16. The open side is ideally two thirds or 240° of the cylinder circumference. The deflector side 24 is rotatably positioned between two control locations, one blocking or preventing air flow to the building chamber port 22 and the other blocking or preventing air flow to the passageway 12 fluidly connecting the building chamber 17 to the storage chamber 18. Both ends of the blower cylinder 20 are closed to help prevent air flow losses.

At either end of the cylinder valves 19 and 20 is disposed an integral circular mounting ring 26 having a circumferential track 27 formed therein. Internal ducting walls 28 have circular openings therein defining a supporting circular edge adapted to cooperate with the track 27 to rotatably support the cylinders 19 and 20 within their respective chambers. The ducting walls 28 serve to confine and direct air flow within the controller 10. At the contact position between the track 27 and the duct wall 28 a circular rubber guide 29 is formed along the edges of the duct wall to conformably receive the track on both cylinder ends (FIG. 5). In this manner air losses are minimized, at the same time minimizing the co-efficient of friction which assists in lowering the turning moments necessary to rotate cylinders 19 and 20 by control motors 30. Relatively short axles 31 extend away from a disc shaped wooden cap 32 retained within the support rings 26 to mesh with the control motor 30. Mounting brackets 33 between the internal partitions 11 of the module 13 can be used for supporting the control motor 30 as shown in FIG. 1 for the blower control cylinder 20.

The collector control cylinder valve 19 is positioned within the collector intake chamber 14 so that the longitudinal axis of the cylinder lies parallel to a horizontal plane through the control module 13, when the module is disposed as in FIG. 1, and transverse to the ducting entering the port 22 of chamber 14 from the collector. The blower control cylinder 20 is similarly mounted in a duct wall 28 of the building chamber 17 with its longitudinal axis set perpendicular to the horizontal plane through the control module 13.

Limits of rotation of both cylinder valves 19 and 20 are governed by semi-circular crossed rubber lips 34 running longitudinally along both interfaces between the flow deflector 24 and the open side 25 of the cylinders 19 and 20. The lips protrude and are so positioned to enter concave sealing points 35 adapted to receive the lips and form a seal with the duct walls 28 as the cylinders are rotated between their two flow control positions (FIG. 3).

Control cylinder valves 19 and 20 are activated through control motors 30 in either a manual or automatic mode. Temperature sensors can be set to activate control motors 30 in an automatic mode. Simple comparisons between the needs of the area to be heated, the collector temperature and the storage temperature can be compared to either introduce heat from the collector to the building, or if the building is not in need of heat and the collector temperature is in excess of that in the storage unit, the heat can be sent to storage through the storage chamber 18. Many methods of activation based upon these comparative temperatures will be apparent to those of skill in the pertinent art.

MODES OF OPERATION

The solar controller 10 is adapted to efficiently guide heated air to the area to be heated from either the collector itself or from the storage unit. The unit can be used for cooling by drawing cooler air and storing the cooler air in the storage unit for distribution through the controller or can be used for heating directly from the collector or from the storage unit. Depending on the flow path chosen, either manually or by automatic control, various modes of operation are available as depicted in FIGS. 6a through 6c.

In the first mode of operation (FIG. 6a) the unit is utilized to direct air flow directly from the collector to the serviced building. Air is drawn from the collector into the control module 13 by the higher pressure created downstream of the blower 16. The air is thereby drawn through duct work and the port 22 into the collector chamber 14. In this mode, the collector flow control cylinder valve 19 presents its open side 25 to the port 22 leading to the collector, sealig off any air flow to or from the storage chamber 18. Air is drawn through the blower and exhausted into the building exhaust chamber 17, where the blower flow control cylinder 20 is positioned so as to also seal off the storage chamber 18 as well as the heat exchanger 23, directing flow to the area to be heated.

In the second mode of operation, the unit is utilized to direct air flow from the collector to the storage unit for later use. Temperature values indicate that the building or area to be heated or cooled is at a reasonable temperature. The storage unit and possibly heat exchanger 23 are therefore available for transfer of any heat retained in the air from the collector. Air is channeled through the collector chamber 14 to the blower 16 and into the building chamber 17 as in the first mode of operation, but the blower control cylinder valve 20 seals off the building or area to be heated, directing the air through the heat exchanger 23 and into storage (FIG. 6b).

In the third mode of operation the unit is utilized to direct air flow from the storage unit to the building. The collector temperature is insufficient to handle the temperature requirement of the building or area to be heated or cooled, but storage has available stored energy for heating or cooling. Ducting allows air to enter the storage chamber 18. The collector is sealed off by the collector control cylinder valve 19 which presents its flow deflector side 24 to the collector and open side 25 to the storage chamber 18. The base port 36 remains in continual communication with the blower chamber 15. As before, the blower 16 creates high pressure downstream of its operation in the building chamber 17 and low pressure upstream in the storage chamber 18. Air is exhausted to the building chamber 17 where the blower control cylinder 20 presents its open side 25 to the exhausted air and seals off the heat exchanger 23 and storage chamber 18 with its deflector side 24, directing air flow to the building to be heated (FIG. 6c).

Though the invention has been described in considerable detail, it will be understood that variations and modifications can be affected within the spirit and scope of the invention.

What is claimed is:

1. A building heating control device mounted within air confining means for selectively directing air flow from one of two thermal source areas to a single area of thermal need, said air confining means having first and second air flow passageways in communication with said source areas and a third air flow passageway in communication with said area of need, comprising in combination:

a hollow cylinder rotatably mounted within ductwork forming said passageways, so as to permit rotation of said cylinder about its longitudinal axis, said cylinder having a cylindrical wall, an end cap and an open base port, a portion of the cylindrical wall being removed to form an open side extending substantially the entire length of the cylinder and a deflector side, said end cap and open port each circumferentially conformed by said ductwork in a sliding air sealed relationship, said cylinder being movable between a first position wherein the deflector side blocks air flow communication between the first said passageway and said area of need, and a second position wherein the deflector side blocks air flow communication between the second of said passageways and said area of need, the air flow being continuously directed by the deflector side along the longitudinal axis of said cylinder and out of the base port of said cylinder to the area of need; and means for selectively rotating said cylinder between said positions.

2. A building heating control device mounted within air confining means for selectively directing air flow from a thermal source area to one of two alternative areas of thermal need, said air confining means having a first air flow passageway in communication with said source area and second and third air flow passageways in air flow communication with the areas of need, comprising in combination:

a hollow cylinder rotatably mounted within ductwork forming said passageways, so as to permit rotation of said cylinder about its longitudinal axis, said cylinder having a cylinder wall, an end cap and an open base port, a portion of the cylindrical wall being removed to form an open side extending substantially the entire length of the cylinder and a deflector side, said end cap circumferentially conformed by said ductwork in a sliding air sealed relationship, said open port closed off by said ductwork in a sliding air sealed relationship, said cylinder being movable between a first position wherein said deflector side prevents air flow through said second passageway, while the open side allows air flow through said third passageway to an area of need, and a second position wherein the third passageway is blocked by said deflector side and the open side allows air flow through said second passageway, said open side being in continual air flow communication with said first passageway to allow air flow into said cylinder from said source area; and means for selectively rotating said cylinder between said positions.

3. The invention defined in claim 1 wherein a second cylinder is positioned along and rotatably mounted within the ductwork forming said third passageway, said second cylinder having a cylindrical wall, an end cap and an open base port, a portion of the cylindrical wall being removed to form an open side extending substantially the entire length of the second cylinder and generally two hundred forty degrees of the second cylinder circumference and a deflector side extending generally one hundred twenty degrees of the second cylinder circumference, said end cap circumferentially enclosed by said ductwork of said third passageway in a sliding air sealed relationship, said open port closed off in a sliding air sealed relationship with said ductwork of said third passageway, said second cylinder being movable between a first position wherein said open side allows air flow to a first area of thermal need and said deflector side prevents air flow to a second area of thermal need and a second position wherein the open side allows air flow to the second area of thermal need and the deflector side prevents air flow to the first area of thermal need.

4. The invention defined in claim 2 wherein a second cylinder is positioned along and rotatably mounted within the ductwork forming said first air flow passageway, said second cylinder having a cylindrical wall, an end cap and an open base port, a portion of the cylindrical wall being removed to form an open side extending substantially the entire length of the second cylinder and a deflector side, said end cap and open port each circumferentially enclosed by said ductwork of said first passageway in a sliding air sealed relationship, said second cylinder being movable between a first position wherein the open side allows air flow from one thermal source and the deflector side prevents air flow from a second thermal source and a second position wherein the open side allows air flow from the second thermal source and the deflector side prevents air flow from the first thermal source.

5. A building heating control device mounted within chamber air confining means for selectively directing air control from one of two thermal source areas to a single area of thermal need, said chamber having first and second air flow passageways in communication with said source areas and a third air flow passageway in communication with said area of need, comprising in combination:

a hollow cylinder rotatably mounted within ductwork forming said passageways so as to permit rotation of said cylinder about a longitudinal axis, said cylinder having a cylindrical wall, an end cap and an open base port, a portion of the cylindrical wall being removed to form an open side extending substantially the entire length of the cylinder and a deflector side;

circluar mounting rings disposed on either end of said cylinder, each mounting ring having a circumferential track integrally connected around the circumference thereof, said tracks adapted to circumferentially receive ductwork forming said chamber, whereby said cylinder is movable about said longitudinal axis upon said circumferential track between a first position wherein the deflector side blocks air flow communication between the first said passageway and said area of need, and a second position wherein the deflector side blocks air flow communication between the second of said passageways and area of need, the air flow being continuously directed by the deflector side along the longitudinal axis of said cylinder and out of the base port of said cylinder to the area of need; and means for selectively rotating said cylinder between said positions.

6. The invention is defined in claim 5 wherein said ductwork has a circular guide attached to a circular opening in said ductwork, said guide of said ductwork circumferentially extending about the track in the mounting ring of the hollow cylinder.

7. A building heating control device mounted within chamber air confining means for selectively directing air flow from a thermal source area to one of two alternative areas of thermal need, said chamber having a first air flow passageway in communication with said source area and second and third air flow passageways in air flow communication with the areas of need, comprising in combination:

a hollow cylinder rotatingly mounted within ductwork forming said pasageways so as to permit rotation of said cylinder about its longitudinal axis, said cylinder having a cylindrical wall, an end cap and an open base port, a portion of the cylindrical wall being removed to form an open side extending substantially the entire length of the cylinder and generally two hundred forty degrees of the cylinder circumference and a deflector side extending generally one hundred twenty degrees of the cylinder circumference.

a circular mounting ring disposed on an end near the end cap of said cylinder, each mounting ring having a circumferential track integrally connected around the circumference thereof, said track at the end cap adapted to circumferentially receive ductwork forming said chamber whereby said cylinder is movable between a first position wherein said deflector side prevents air flow through said second passageway, while the open side allows air flow through said third passageway to an area of need, and a second position wherein the third passageway is blocked by said deflector side and the open side allows air flow through said second passageway, said open side being in continual air flow communication with said first passageway to allow air flow into said cylinder from said source area; and means for collectively rotating said cylinder between said positions.

8. The invention as defined in claim 7 wherein the ductwork has a guide around the tracks that slidingly and sealingly contact said track.

* * * * *